United States Patent
Gore

(10) Patent No.: US 7,314,705 B2
(45) Date of Patent: *Jan. 1, 2008

(54) COMPOSITIONS, SYSTEMS, AND METHODS FOR IMAGING

(75) Inventor: Makarand P. Gore, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/421,880

(22) Filed: Jun. 2, 2006

(65) Prior Publication Data

US 2006/0216655 A1 Sep. 28, 2006

Related U.S. Application Data

(62) Division of application No. 10/656,021, filed on Sep. 5, 2003, now Pat. No. 7,083,904.

(51) Int. Cl.
*G03C 1/73* (2006.01)

(52) U.S. Cl. ............ 430/343; 430/332; 430/333; 430/338; 430/349; 430/964; 503/217; 503/226

(58) Field of Classification Search ........... 430/343, 430/332, 333, 338, 340, 964; 503/217, 226
See application file for complete search history.

(56) References Cited

U.S. PATENT DOCUMENTS

| | | | |
|---|---|---|---|
| 3,658,543 A | 4/1972 | Gerlach, Jr. et al. | |
| 4,142,151 A | 2/1979 | Hansen | |
| 4,170,190 A | 10/1979 | Warner | |
| 4,682,857 A | 7/1987 | Tan | |
| 4,835,475 A | 5/1989 | Hanakura et al. | |
| 4,835,476 A | 5/1989 | Kurosawa | |
| 4,838,664 A | 6/1989 | Graham | |
| 4,891,250 A | 1/1990 | Weibe et al. | |
| 5,234,797 A * | 8/1993 | Satake et al. | 430/338 |
| 5,294,374 A | 3/1994 | Martinez et al. | |
| 5,409,797 A | 4/1995 | Hosoi et al. | |
| 5,434,119 A * | 7/1995 | Satake et al. | 503/216 |
| 5,460,646 A | 10/1995 | Lazzouni et al. | |
| 5,484,685 A * | 1/1996 | Tai et al. | 540/452 |
| 5,543,382 A | 8/1996 | Watanabe et al. | |
| 5,673,028 A | 9/1997 | Levy | |
| 5,679,661 A | 10/1997 | Willey | |
| 6,015,896 A | 1/2000 | Mistry et al. | |
| 6,017,981 A | 1/2000 | Hugo | |
| 6,022,648 A | 2/2000 | Jacobson et al. | |

(Continued)

FOREIGN PATENT DOCUMENTS

DE 33 19738 A1 1/1983

(Continued)

OTHER PUBLICATIONS

Abstract of JP 05-278329, Oct. 1993.*

(Continued)

*Primary Examiner*—Hoa Van Le

(57) ABSTRACT

A composition, method, and system for recording an image. The system includes an imaging material in which radiation energy is absorbed by an antenna material. The antenna material may be chosen from the group consisting of phthalocyanines and naphthalocyanines.

6 Claims, 1 Drawing Sheet

U.S. PATENT DOCUMENTS

| | | |
|---|---|---|
| 6,025,486 A | 2/2000 | Mistry et al. |
| 6,137,669 A | 10/2000 | Chiang et al. |
| 6,251,571 B1 | 6/2001 | Dessauer et al. |
| 6,407,560 B1 | 6/2002 | Walraven et al. |
| 6,486,473 B2 | 11/2002 | Salapow et al. |
| 6,549,025 B1 | 4/2003 | Tubera et al. |
| 6,902,791 B2 * | 6/2005 | Kawasato et al. ......... 428/141 |
| 6,974,661 B2 * | 12/2005 | Gore et al. ................. 430/343 |
| RE38,979 E * | 2/2006 | Koike et al. ............... 428/64.1 |
| 7,083,904 B2 * | 8/2006 | Gore .......................... 430/332 |
| 7,169,542 B2 * | 1/2007 | Kasperchik et al. ........ 430/343 |
| 2001/0028934 A1* | 10/2001 | Baer et al. ................. 428/40.1 |
| 2002/0045548 A1 | 4/2002 | Saito |
| 2002/0089580 A1 | 7/2002 | Suzuki et al. |
| 2002/0183203 A1 | 12/2002 | Hoefs et al. |
| 2003/0003399 A1 | 1/2003 | Muller et al. |
| 2004/0146812 A1 | 7/2004 | Gore et al. |

FOREIGN PATENT DOCUMENTS

| | | |
|---|---|---|
| EP | 0 378 336 B1 | 12/1993 |
| EP | 0 716 135 A1 | 6/1996 |
| EP | 0 566 353 B1 | 8/1998 |
| EP | 1 249 343 A2 | 10/2002 |
| JP | 1986 322554 | 10/1986 |
| JP | 61 023 993 | 6/1994 |
| JP | 1994 257362 | 6/1994 |
| JP | 2003 149838 | 5/2003 |
| JP | 2003 602041 | 5/2003 |
| JP | 2003 178488 | 6/2003 |
| JP | 2003 549257 | 6/2003 |
| JP | 1986 123158 | 5/2007 |

OTHER PUBLICATIONS

"Protected Activators For Use in Leuco Dye Compositions," U.S. Appl. No. 10/656,735, filed Sep. 5, 2003, Hewlett-Packard Company, pp. 1-28.

"Metal Salt Activators For Use in Leuco Dye Compositions," U.S. Appl. No. 10/656,539, filed Sep. 5, 2003, Hewlett-Packard Company, pp. 1-30.

Bouas-Laurent et al., "Organic Photochromism," Pure Appl. Chem., vol. 73, No. 4, pp. 639-665, 2001.

* cited by examiner

COMPOSITIONS, SYSTEMS, AND METHODS FOR IMAGING

This is a division of application Ser. No. 10/656,021, filed Sep. 5, 2003, now U.S. Pat. No. 7,083,904.

BACKGROUND

Materials that produce color change upon stimulation with energy (e.g., light or heat) may have possible applications in imaging. For example, such materials may be found in thermal printing papers and instant imaging films. Generally, the materials and compositions known so far may require a multifilm structure and further processing to produce an image (e.g., instant camera films). And in the case of facsimile and thermal head media, high energy input of greater than 1-5 $J/cm^2$ is needed to achieve good images. The compositions in multifilm media may require control of diffusion of color-forming chemistry and further processing, and are in separate phases and layers. Many thermal and facsimile paper coatings consist of coatings prepared by applying fine dispersions of more than two components. The components mix and react upon application of energy, resulting in a colored material. For the necessary mixing, the particles may need to contact across three or more phases or layers and merge into a new phase. Because of these multiple phases and layers, high energy is required to perform this process. For example, a relatively powerful carbon dioxide laser with an energy density of 3 $J/cm^2$ at times of much greater than 100 µs may be needed to produce a mark. In some instances, this high energy application may cause damage to the imaging substrate.

In many situations, it may be desirable to produce a visible mark more efficiently using either a less intense, less powerful, and/or shorter energy application. Therefore, there is a need for fast marking coatings, possibly composed of fewer than three phases and in single layer. One method may be to provide a binder, a dye, a color developer, and an antenna, wherein the dye changes color when reacted with the color developer, wherein one of the dye and the color developer is soluble in the binder at ambient conditions, wherein the antenna and the binder soluble compound are dissolved in the binder; and the other of the dye and the color developer compound are substantially uniformly distributed in the binder. In such systems, if the antenna is not substantially thermally and light stable, the ability to mark may be lost or diminished, i.e., due to absorption of ambient energy (e.g., sunlight, artificial light, and/or ambient heat). The antenna may lose its ability to absorb energy and deliver it for formation of an image. For example, even antennae which have previously been considered stable (i.e., with an extinction coefficient greater than 100,000, or less than 20% loss in absorption, after exposure to light or heat stress) may be highly susceptible to ambient energy and may show diminished light marking ability after exposure to ambient energy.

In addition, the formed image may fade if it has not been developed with sufficient energy. For example, many markings may fade after exposure to 40° C./80% humidity after three days. This fading may be due to the inability of the antenna to deliver sufficient energy to the dye, especially due to effect of exposure to light or heat. Heretofore, it may be desirable to produce a system which solves one or more of the foregoing problems.

SUMMARY

Disclosed herein are imaging materials and methods of making imaging materials. The materials disclosed herein may include an antenna which comprises a compound selected from the group consisting of compounds comprising a phthalocyanine chromophore and compounds comprising a naphthalocyanine chromophore.

BRIEF DESCRIPTION OF THE DRAWINGS

For a detailed description of embodiments of the invention, reference will now be made to the accompanying drawings in which.

NOTATION AND NOMENCLATURE

Certain terms are used throughout the following description and claims to refer to particular system components. As one skilled in the art will appreciate, companies may refer to components by different names. This document does not intend to distinguish between components that differ in name but not function. In the following discussion and in the claims, the terms "including" and "comprising" are used in an open-ended fashion, and thus should be interpreted to mean "including, but not limited to . . . ." The term "leuco dye" is a color forming substance which is colorless or one color in a non-activated state and produces or changes color in an activated state. As used herein, the term "activator" is a substance which reacts with a leuco dye and causes the leuco dye to after its chemical structure and change or acquire color. By way of example only, activators may be phenolic or other proton donating species which can effect this change. The term "antenna" means a radiation absorbing compound. The antenna readily absorbs a desired specific wavelength of the marking radiation, and transfers energy to cause marking.

DETAILED DESCRIPTION

The following discussion is directed to various embodiments of the invention. The embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and is not intended to intimate that the scope of the disclosure, including the claims, is limited to that embodiment.

Embodiments of the present invention include coatings that result in markings which are substantially stable in ambient and near ambient conditions. The materials used to produce markings upon stimulation by energy may include a color-former such as a fluoran leuco dye and an activator such as sulphonylphenol dispersed in a matrix such as radiation-cured acrylate oligomers and monomers and applied to a substrate. In some embodiments, either the leuco dye or the activator may be substantially insoluble in the matrix at ambient conditions. A substantially stable radiation energy absorber (i.e., antenna) that functions to absorb energy and deliver it to the reactants is also present in this coating. Energy may then be applied by way of, for example, a laser or infrared light. Upon application of the energy, either the activator, the color-former, or both may become heated and mixed which causes the color-former to become activated and a mark to be produced.

Figure 2:
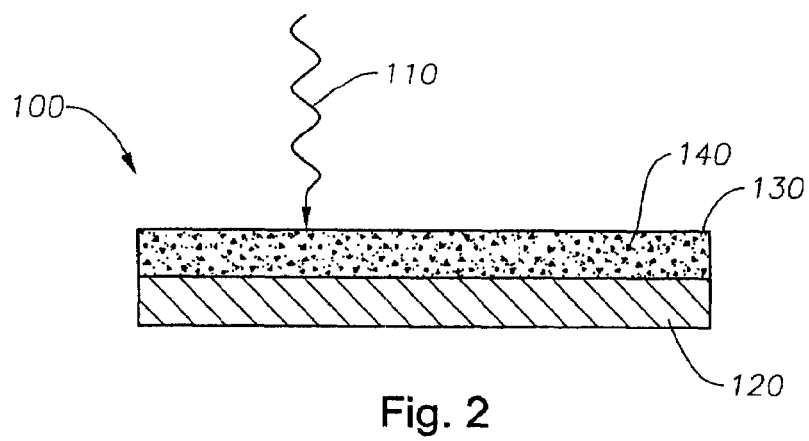
FIG. 2 shows an imaging medium according to an embodiment of the present invention.

Referring now to the embodiments illustrated in FIG. 2, there is shown imaging medium 100, energy 110, substrate 120, imaging composition 130, and suspended particles 140. Imaging medium 100 may comprise a substrate 120. Substrate 120 may be any substrate upon which it is desirable to make a mark, such as, by way of example only, paper (e.g., labels, tickets, receipts, or stationary), overhead transparencies, or the labeling surface of an optical disk such as a CD-R/RW/ROM or DVD-R/RW/ROM.

Imaging composition 130 may comprise a matrix, an activator, an antenna, and a color forming dye. The activator and the color forming dye, when mixed, may change color. Either of the activator and the color forming dye may be soluble in the matrix. The other component (activator or color forming dye) may be substantially insoluble in the matrix and may be suspended in the matrix as uniformly distributed particles 140. The imaging composition 130 may be applied to the substrate via any acceptable method, such as, by way of example only, rolling, spraying, or screen printing.

Energy 110 may be directed imagewise to imaging medium 100. The form of energy may vary depending upon the equipment available, ambient conditions, and desired result. Examples of energy which may be used include IR radiation, UV radiation, x-rays, or visible light. The antenna may absorb the energy and heat the imaging composition 130. The heat may cause suspended particles 140 to reach a temperature sufficient to cause the interdiffusion of the color forming species initially present in the particles (e.g., glass transition temperatures ($T_g$) or melting temperatures ($T_m$) of particles 140 and matrix). The activator and dye may then react to form a color. Without limitation, the antenna may be selected from the following compounds:

(A) silicon 2,3 naphthalocyanine bis(trihexylsilyloxide) (Formula 1) (Aldrich 38,993-5, available from Aldrich, P.O. Box 2060, Milwaukee, Wis. 53201), and matrix soluble derivatives of 2,3 naphthalocyanine (Formula 2)

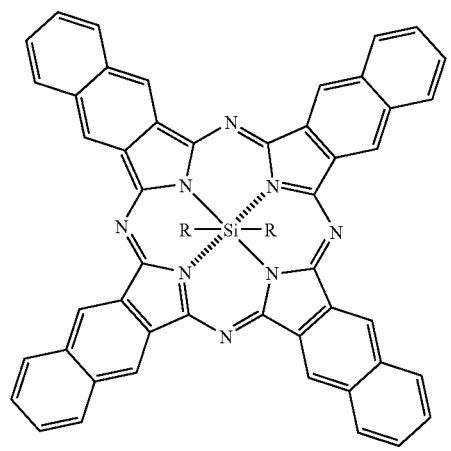

(1)

where R=—O—Si—$(CH_2(CH_2)_4CH_3)_3$;

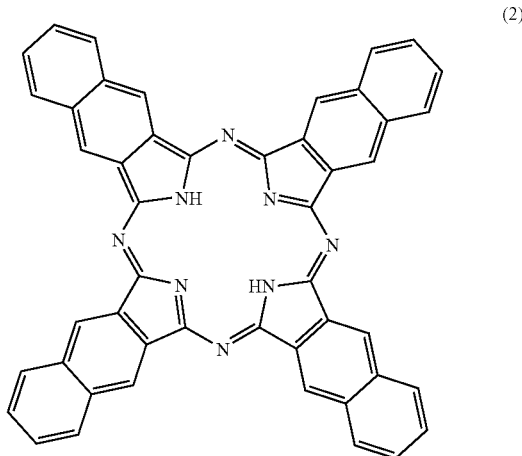

(2)

(B) matrix soluble derivatives of silicon phthalocyanine, described in Rodgers, A. J. et al., 107 J. Phys. Chem. A 3503-3514 (May 8, 2003), and matrix soluble derivatives of benzophthalocyanines, described in *Aoudia, Mohamed,* 119 J. Am. Chem. Soc. 6029-6039 (Jul. 2, 1997), (substructures illustrated by Formula 3 and Formula 4, respectively):

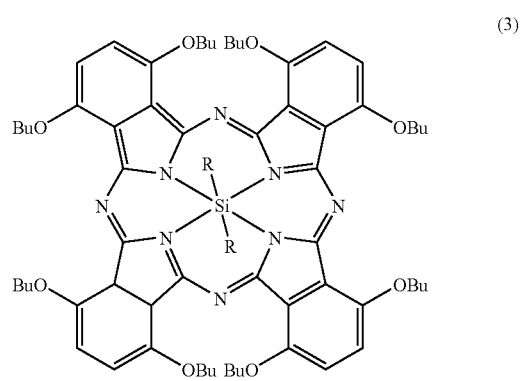

(3)

R = Trihexylsilyloxy

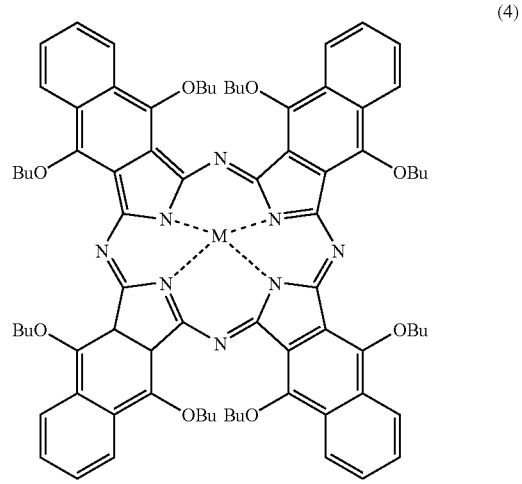

(4)

where M is a metal, and;

(C) compounds such as those shown in Formula 5 (as disclosed in U.S. Pat. No. 6,015,896)

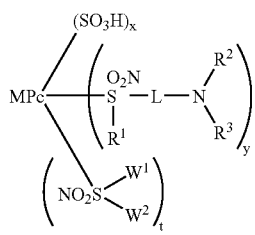

(5)

where M is a metal or hydrogen; Pc is a phthalocyanine nucleus; $R^1$, $R^2$, $W^1$, and $W^2$ are independently H or optionally substituted alkyl, aryl, or aralkyl; $R^3$ is an aminoalkyl group; L is a divalent organic linking group; x, y, and t are each independently 0.5 to 2.5; and (x+y+t) is from 3 to 4;

(D) compounds such as those shown in Formula 6 (as disclosed in U.S. Pat. No. 6,025,486)

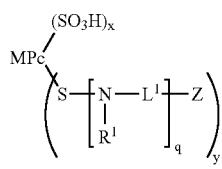

(6)

where M is a metal or hydrogen; Pc is a phthalocyanine nucleus; each $R^1$ independently is H or an optionally substituted alkyl, aryl, or aralkyl; $L^1$ independently is a divalent organic linking group; Z is an optionally substituted piperazinyl group; q is 1 or 2; x and y each independently have a value of 0.5 to 3.5; and (x+y) is from 2 to 5; or (E) 800NP (a proprietary dye available from Avecia, PO Box 42, Hexagon House, Blackley, Manchester M9 8ZS, England).

The activator (e.g., bisphenol-A) and color-forming dye 90 (e.g., 2'-anilino-3'-methyl-6'-(dibutylamino)fluoran, the structure of which is set forth below as Formula 7)

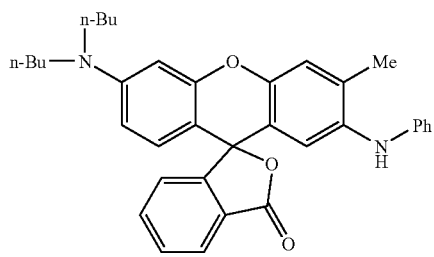

(7)

may act in tandem to produce a mark. The activator and dye may be any two substances which when reacted together produce a color change. When reacted, the activator may initiate a color change in the dye or develop the dye. One of the activator and the dye may be soluble in the matrix (e.g., lacquer 30) at ambient conditions. The other may be substantially insoluble in the lacquer at ambient conditions. By "substantially insoluble," it is meant that the solubility of the other in the lacquer at ambient conditions is so low, that no or very little color change may occur due to reaction of the dye and the activator at ambient conditions. Although, in the embodiments described above, the activator may be dissolved in the lacquer and the dye remains suspended as a solid in the matrix at ambient conditions, it is also acceptable that the color former may be dissolved in the matrix and the activator may remain as a suspended solid at ambient conditions. Activators may include, without limitation, proton donors and phenolic compounds such as bisphenol-A and bisphenol-S. Color formers may include, without limitation, leuco dyes such as fluoran leuco dyes and phthalide color formers as described in "The Chemistry and Applications of Leuco Dyes", Muthyala, Ramiah, ed., Plenum Press (1997) (ISBN 0-306-45459-9), incorporated herein by reference. Examples of acceptable fluoran leuco dyes comprise the structure shown in Formula 8:

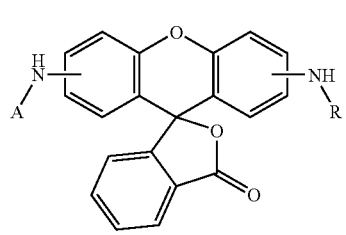

(8)

where A and R are aryl or alkyl groups.

Figure 1:
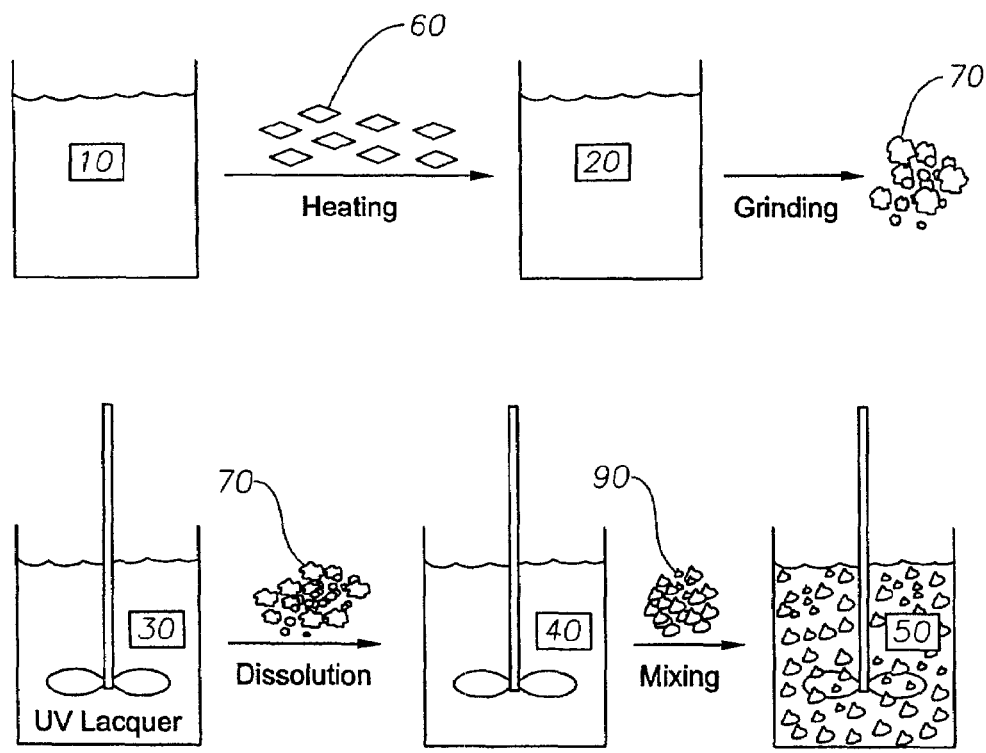
FIG. 1 shows a method of preparing an imaging material according to an embodiment of the present invention.

Lacquer 30 may be any suitable matrix for dissolving and/or dispersing the activator, antenna 60, and color former 90 (FIG. 1). Acceptable lacquers may include, by way of example only, UV curable matrices such as acrylate derivatives, oligomers and monomers, with a photo package.

EXAMPLE 1

Referring to the embodiments of FIG. 1, which shows a method for preparing an imaging solution in accordance with embodiments of the present invention, the method may comprise an activator melt 10, an activator/antenna solution 20, a UV curable lacquer solution 30, a lacquer/antenna/activator solution 40, and a two phase UV curable paste 50.

In accordance with the embodiments illustrated in FIG. 1, 2 grams of dibenzyl oxalate was heated to melting (about 85° C.). 20 grams of activator bisphenol-A and one gram of antenna silicon 2,3 naphthalocyanine bis(trihexylsilyloxide) (Formula 1), were dissolved in the melted dibenzyl oxalate. The activator/antenna solution 20 was cooled and ground into a fine powder 70.

Five grams of the ground activator/antenna powder 70 was dissolved in 15.3 g Nor-Cote CDG000 UV-lacquer 30 to form the lacquer/antenna/activator solution 40.

Ten grams of m-terphenyl (accelerator) was melted in a beaker. The melt was heated to 110° F. 100 grams of 2'-anilino-3'-methyl-6'-(dibutylamino) fluoran (Formula 9) were added in small increments to the melt upon constant stirring: (average particle size less than about 5 μm). The temperature of the mixture was increased up to 170-180° C. Stirring was continued until complete dissolution of the 2'-anilino-3'-methyl-6'-(dibutylamino)fluoran in the melt (approximately 10-15 min) to form an accelerator/leuco-dye solution. 550 mg of silicon 2,3 naphthalocyanine bis(trihexylsilyloxide) (Formula 1), was added to the melt upon constant stirring.

Heating and stirring was continued for about two to three additional minutes until the IR dye was completely dissolved in the melt to form a leuco dye/antenna/accelerator alloy (eutectic). Temperature of the leuco dye/antenna/accelerator alloy was kept to below about 190° C.

The leuco-dye/antenna/accelerator alloy was then poured into a pre-cooled freezer tray lined with aluminum foil, where it was allowed to solidify. The solidified melt was milled into a coarse powder and then attrition-ground in the aqueous dispersion until the average particle size of the ground alloy was less than about 4 μm. The ground alloy was dried in a vacuum to form a leuco-dye eutectic powder.

The mixture of leuco-dye/antenna/accelerator alloy and lacquer/antenna/activator solution 40 was formed into a UV-curable paste 50 and screen printed onto a substrate at a thickness of approximately about 5 to about 7 μm to form an imaging medium 100 (FIG. 2). The coating on the medium was then UV cured by mercury lamp.

Direct marking was effected on the resulting coated substrate with a 45 mW laser. A mark of approximately 20 μm×45 μm was produced with duration of energy applications of about 30 μsec to about 100 μsec. Direct imaging occurs when the desired image is marked on the imaging medium, without the use of a printing intermediary.

EXAMPLE 2

The method of Example 1 was carried out, except that 20 grams of phenol, 4,4'-sulfonylbis[2-(2-propenyl)-(9CI) (Formula 10): was used as the activator and 1.2 grams of antenna silicon 2,3 naphthalocyanine bis(trihexylsilyloxide) (Formula 1), were dissolved in the melted dibenzyl oxalate to form the activator/antenna solution 20. Activator/antenna solution 20 was cooled and ground into a fine powder 70. Additionally, instead of using 100 grams of 2'-anilino-3'-methyl-6'-(dibutylamino) fluoran as the leuco-dye, 15 grams of leuco-dye 2-anilino-3-methyl-6-(N-ethyl-N-isoamylamino)fluorane (Formula 11) (average particle size<5 μm) were used to form the accelerator/leuco-dye solution.

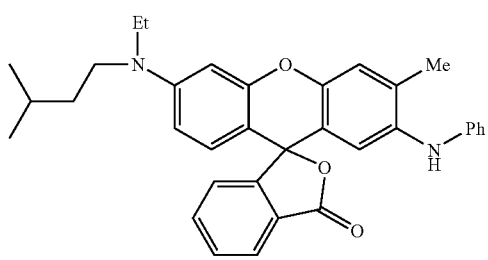

(11)

As with Example 1, the mixture of leuco-dye/antenna/accelerator alloy and lacquer/antenna/activator solution 40 was formed into a UV-curable paste 50 and screen printed onto a substrate at a thickness of approximately 7 μm to form an imaging medium. The coating on the medium was then UV cured by mercury lamp. Direct marking was effected on the resulting coated substrate with a 45 mW laser. A mark of approximately 20 μm×45 μm, with optical density of >0.5, was produced with energy applications of about 60 μsec to 100 μsec.

Similar procedures were followed using antennae of indocyanine green (Aldrich 22886-9) (Formula 12);

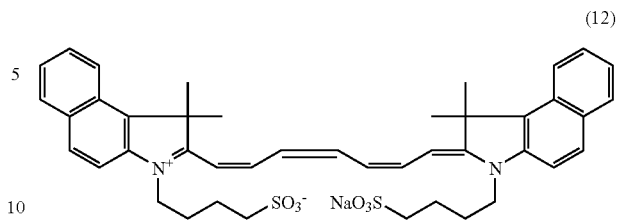

(12)

IR 780 (Aldrich 42,531-1) (Formula 13); and 800NP

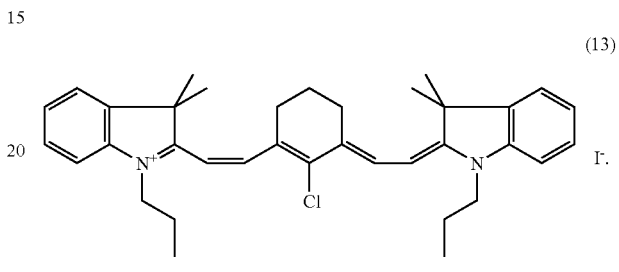

(13)

The coatings were exposed to a 21,000 lux fluorescent light for 24 hours, and screened for the marking speed and optical density. Coatings containing indocyanine green or IR 780 did not show any markings after the light treatment. Coatings containing silicon 2,3 naphthalocyanine bis(trihexylsilyloxide) antenna (Formula 1) or 800NP showed less than 20% drop in optical density after the light exposure.

The foregoing discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. An image recording medium comprising:
   a substrate;
   an imaging composition deposited on said substrate, said composition comprising:
      a solvent;
      an antenna dissolved in said solvent, said antenna comprising a compound selected from the group consisting of compounds comprising a phthalocyanine chromophore and compounds comprising a naphthalocyanine chromophore;
      a dye; and
      a color initiator;
      wherein the dye changes color when mixed with the color initiator;
      wherein one of the color initiator and the dye is soluble in the solvent at ambient conditions;
      wherein the other of the color initiator and the dye is substantially insoluble in the solvent at ambient conditions; and
      wherein the substantially insoluble component is substantially uniformly distributed in the solvent.

2. The medium of claim 1 wherein the antenna readily absorbs infrared radiation of a predetermined frequency.

3. The medium of claim 1 wherein the antenna readily absorbs laser radiation of a predetermined frequency.

4. The medium of claim 1 wherein the antenna is selected from the group consisting of (A) silicon 2,3 naphthalocyanine bis(trihexylsilyloxide); (B) derivatives of 2,3 naphthalocyanine; (C) derivatives of silicon phthalocyanine; (D) derivatives of benzophthalocyanines; (E)

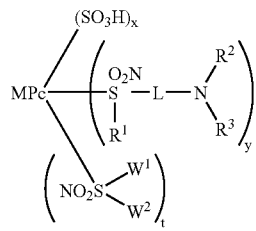

where M is a metal or hydrogen; Pc is a phthalocyanine nucleus; $R^1$, $R^2$, $W^1$, and $W^2$ are independently H or optionally substituted alkyl, aryl, or aralkyl; $R^3$ is an aminoalkyl group; L is a divalent organic linking group; x, y, and t are each independently 0.5 to 2.5; and (x+y+t) is from 3 to 4; (F)

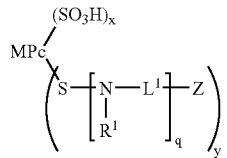

where M is a metal or hydrogen; Pc is a phthalocyanine nucleus; each $R^1$ independently is H or an optionally substituted alkyl, aryl, or aralkyl; each $L^1$ independently is a divalent organic linking group; Z is an optionally substituted piperazinyl group; q is 1 or 2; x and y each independently have a value of 0.5 to 3.5; and (x+y) is from 2 to 5; and (G) 800NP.

5. The medium of claim 1 wherein the substrate comprises paper.

6. The medium of claim 1 wherein the substrate comprises a compact disc or DVD.

* * * * *

UNITED STATES PATENT AND TRADEMARK OFFICE
CERTIFICATE OF CORRECTION

PATENT NO. : 7,314,705 B2 Page 1 of 1
APPLICATION NO. : 11/421880
DATED : January 1, 2008
INVENTOR(S) : Makarand P. Gore It is certified that error appears in the above-identified patent and that said Letters Patent is hereby corrected as shown below:

In column 2, line 35, delete "after" and insert -- alter --, therefor.

In column 6, line 60, after "stirring:" insert

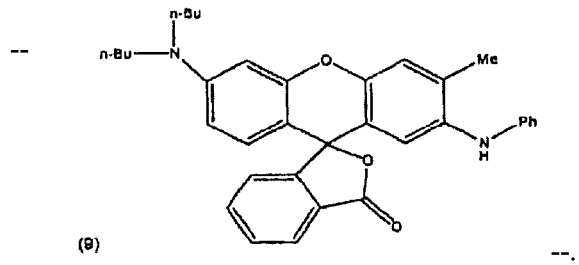

In column 7, line 32, after "(Formula 10):" insert

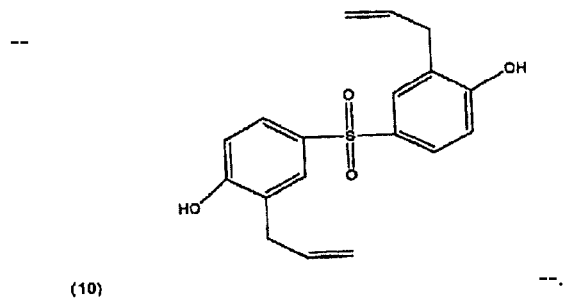

Signed and Sealed this

Fifth Day of August, 2008

JON W. DUDAS
*Director of the United States Patent and Trademark Office*